United States Patent [19]

Yoshida

[11] Patent Number: 5,751,505
[45] Date of Patent: May 12, 1998

[54] MAGNETIC RECORDING LAYER FORMED ON A PHOTOGRAPHIC FILM AND HAVING AN IDENTIFICATION CODE WHICH IDENTIFIES INFORMATION SEGMENTS, AND METHOD FOR RECORDING THE SAME

[75] Inventor: Yutaka Yoshida, Saitama, Japan

[73] Assignee: Fuji Photo Film Co., Ltd., Kanagawa, Japan

[21] Appl. No.: 665,767

[22] Filed: Jun. 17, 1996

Related U.S. Application Data

[63] Continuation of Ser. No. 360,954, Dec. 21, 1994, abandoned.

[30] Foreign Application Priority Data

Dec. 21, 1993  [JP]  Japan .................... 5-322393

[51] Int. Cl.⁶ .................... G11B 5/09; G11B 5/00
[52] U.S. Cl. .................... 360/48; 360/1; 396/319
[58] Field of Search .................... 360/1, 48; 355/40; 354/106; 396/319

[56] References Cited

U.S. PATENT DOCUMENTS

| | | | |
|---|---|---|---|
| 4,402,021 | 8/1983 | Sonoda et al. | 360/48 |
| 4,486,876 | 12/1984 | Gaunt, Jr. et al. | 375/249 |
| 4,965,627 | 10/1990 | Robison | 355/40 |
| 5,021,820 | 6/1991 | Robison et al. | 360/1 X |
| 5,294,949 | 3/1994 | Robison et al. | 360/48 X |
| 5,469,272 | 11/1995 | Kubota et al. | 360/32 |

OTHER PUBLICATIONS

DCC System Description vol. 1, Philips Consumer Electronics, pp. 17-1 thru 17-20, Mar. 1993.

*Primary Examiner*—Aristotelis M. Psitos
*Assistant Examiner*—Regina Y. Neal
*Attorney, Agent, or Firm*—Sughrue, Mion, Zinn, Macpeak & Seas, PLLC

[57] ABSTRACT

A magnetic recording method for recording data on a magnetic recording layer of a photographic filmstrip. A block is written on a track while the filmstrip is advanced by one frame. Each block comprises at least a field. Each field has a field start code in the beginning, and a pair of 8-bit ID codes are recorded following the field start code. The ID codes represent the information items of the information content contained in the field in a composite fashion. The ID codes are followed by a series of data representative of the content of the information. The end of each field is allocated to a parity check bit.

29 Claims, 15 Drawing Sheets

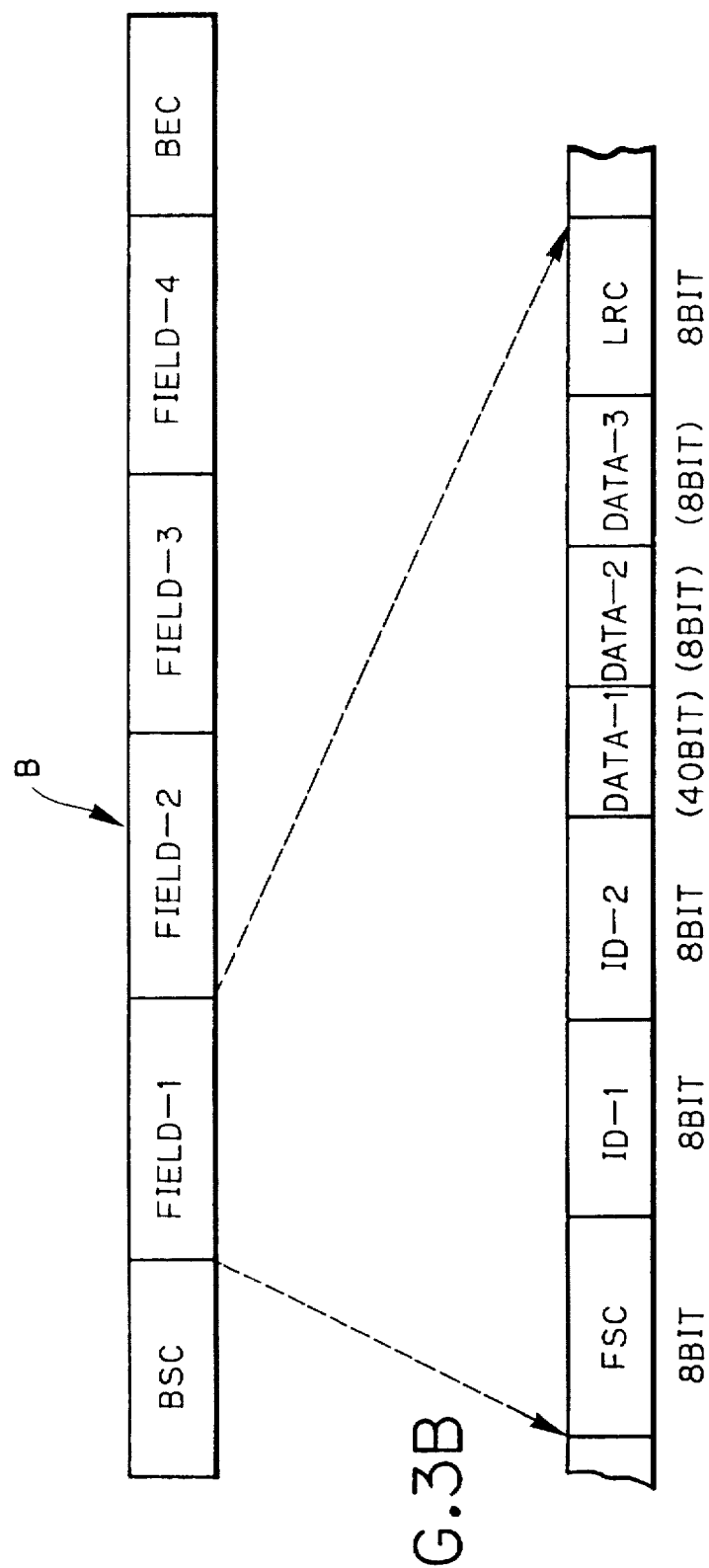
F I G. 3A
F I G. 3B

FIG.9

[NUMERICAL DATA CODE TABLE]

| | | b8 | P | 0 | 0 | 0 | 0 | 1 | 1 | 1 | 1 |
|---|---|---|---|---|---|---|---|---|---|---|---|
| | | b7 | P | 0 | 0 | 1 | 1 | 0 | 0 | 1 | 1 |
| | | b6 | P | 0 | 1 | 0 | 1 | 0 | 1 | 0 | 1 |
| | | b5 | P | 1 | 0 | 0 | 1 | 0 | 1 | 1 | 0 |
| b4 | b3 | b2 | b1 | | | | | | | | |
| 0 | 0 | 0 | 0 | P | | 4 | 20 | 36 | 52 | 68 | 84 |
| 0 | 0 | 0 | 1 | | | 5 | 21 | 37 | 53 | 69 | 85 |
| 0 | 0 | 1 | 0 | | BSC | 6 | 22 | 38 | 54 | 70 | 86 |
| 0 | 0 | 1 | 1 | | | 7 | 23 | 39 | 55 | 71 | 87 |
| 0 | 1 | 0 | 0 | | BEC | 8 | 24 | 40 | 56 | 72 | 88 |
| 0 | 1 | 0 | 1 | | | 9 | 25 | 41 | 57 | 73 | 89 |
| 0 | 1 | 1 | 0 | | | 10 | 26 | 42 | 58 | 74 | 90 |
| 0 | 1 | 1 | 1 | | | 11 | 27 | 43 | 59 | 75 | 91 |
| 1 | 0 | 0 | 0 | | FSC1 | 12 | 28 | 44 | 60 | 76 | 92 |
| 1 | 0 | 0 | 1 | 0 | FSC2 | 13 | 29 | 45 | 61 | 77 | 93 |
| 1 | 0 | 1 | 0 | 1 | FSC3 | 14 | 30 | 46 | 62 | 78 | 94 |
| 1 | 0 | 1 | 1 | | FSC4 | 15 | 31 | 47 | 63 | 79 | 95 |
| 1 | 1 | 0 | 0 | 2 | FSC5 | 16 | 32 | 48 | 64 | 80 | 96 |
| 1 | 1 | 0 | 1 | 3 | | 17 | 33 | 49 | 65 | 81 | 97 |
| 1 | 1 | 1 | 0 | | | 18 | 34 | 50 | 66 | 82 | 98 |
| 1 | 1 | 1 | 1 | | | 19 | 35 | 51 | 67 | 83 | 99 |

FIG.10

[CHARACTER DATA CODE TABLE]

| b8 | 0 | 0 | 0 | 0 | 1 | 1 | 1 | 1 | | | | |
|---|---|---|---|---|---|---|---|---|---|---|---|---|
| b7 | 0 | 0 | 1 | 1 | 0 | 0 | 1 | 1 | | | | |
| b6 | 0 | 1 | 0 | 1 | 0 | 1 | 0 | 1 | | | | |
| b5 | 0 | 1 | 0 | 1 | 0 | 1 | 0 | 1 | b1 | b2 | b3 | b4 |
| | | SPACE | 0 | @ | P | ` | p | 0 | 0 | 0 | 0 |
| | | ! | 1 | A | Q | a | q | 1 | 0 | 0 | 0 |
| BSC | | " | 2 | B | R | b | r | 0 | 1 | 0 | 0 |
| | | # | 3 | C | S | c | s | 1 | 1 | 0 | 0 |
| BEC | | . | . | . | . | . | . | 0 | 0 | 1 | 0 |
| | | . | . | . | . | . | . | 1 | 0 | 1 | 0 |
| | | . | . | . | . | . | . | 0 | 1 | 1 | 0 |
| | | . | . | . | . | . | . | 1 | 1 | 1 | 0 |
| FSC1 | | . | . | . | . | . | . | 0 | 0 | 0 | 1 |
| FSC2 | | . | . | . | . | . | . | 1 | 0 | 0 | 1 |
| FSC3 | | . | . | . | . | . | . | 0 | 1 | 0 | 1 |
| FSC4 | | - | = | M | ] | m | } | 1 | 1 | 0 | 1 |
| FSC5 | | . | > | N | < | n | ~ | 0 | 0 | 1 | 1 |
| | | / | ? | O | — | o | DEL | 1 | 1 | 1 | 1 |

FIG.14

| FSC | ID-1 | ID-2 | DATA-1 | DATA-2 | DATA-3 | DATA-4 | LRC |
|---|---|---|---|---|---|---|---|
| 00001000 | 11000001 | 11100011 | DATE OF EXPOSURE | PRINT FORMAT FLASH ON/OFF | SUBJECT DISTANCE | EXPOSURE CORRECTION VALUE | PARITY CHECK DATA |
| 1BYTE | 1BYTE | 1BYTE | 5BYTE | 1BYTE | 1BYTE | 1BYTE | 1BYTE |

FIELD-1 (DATA-1 through DATA-4)

MAGNETIC RECORDING LAYER FORMED ON A PHOTOGRAPHIC FILM AND HAVING AN IDENTIFICATION CODE WHICH IDENTIFIES INFORMATION SEGMENTS, AND METHOD FOR RECORDING THE SAME

This is a continuation of application Ser. No. 08/360,954 filed Dec. 21, 1994 now abandoned.

BACKGROUND OF THE INVENTION

1. Field of the Invention

The present invention relates to a magnetic recording method for recording information on a magnetic recording layer formed on a photographic filmstrip at a high efficiency.

2. Related Art

U.S. Pat. No. 4,965,627 discloses that a filmstrip is provided with a magnetic recording layer which allows recording information such as the type of film and photo-finishing recipe in the factory, or various photographic data through a magnetic recording device of a camera, or print order information in a retail order station. Also in a photofinisher, the magnetic recording layer may be used for recording ID information representative of address of delivery of the developed filmstrip.

Among of the information recorded on the filmstrip, contents relating to necessary items may be read and utilized in various stages of the photographic process, for example, in controlling the exposure in the camera and the printer, or correlating the filmstrip with the photo-prints or the customer. The magnetic recording of information on the filmstrip is useful for automating many steps of the photographic process.

To record various information in various stages on the filmstrip, an intensive and efficient recording method is necessary, because there are limited spaces for the magnetic recording. While those types of information which relates to the whole filmstrip can be recorded in a film leader having a relatively large recording space, most types of information relate to each individual frame and are recordable only after photographing. Therefore, it is necessary to record or read many types of information while the filmstrip is advanced by one frame after each exposure. In case of a photographic filmstrip of ISO 135-type, at most a 36 mm length track per frame is available for magnetic recording.

According to the above U.S. patent, a transparent magnetic recording layer is provided so that the entire film back surface including the back of frame recording portion can be used for recording. Even though the recording space is thus enlarged, it is still desirable to record as much information as possible within a magnetic track for reading and writing information during one-frame advancing of the filmstrip. Moreover, because the filmstrip is stiffer than usual magnetic recording tape, contact of a magnetic head with the track cannot be sufficiently stable. Therefore, simply increasing he recording density could result in an increased frequency of reading error.

To avoid such reading errors, the above U.S. patent suggests providing a plurality of tracks which extend along the film advancing direction over a limited length that corresponds to the length of one frame, and recording various types of information in the form of a block in an individual one of these tracks. In each block, a start sentinel (block start code) is provided in the beginning to indicate the start position of the block. The start sentinel is followed by several fields, each containing a different type of information. And a stop sentinel (block end code) is provided at the end to indicate the end of the block. All of the two types of sentinels and the fields are represented by binary codes.

Each field has a 6-bit ID sentinel (field start code) to indicate the start position of that field. Next to the ID sentinel, a 12-bit (two bytes) ID code representative of an information type is recorded and is used for identifying the type of information that follows it. In the end of the field, a parity check bit is provided.

According to the above described prior method, since the same type of information is recorded in only one field, the number of fields increases with the an increase in the types of information in the block. However, a 2-byte ID code is always recorded at the start of each field. Thus even if merely 1 to 2 bytes is necessary for representing the content of information, the field would have 3 to 4 bytes. Therefore, recording efficiency of one track is certainly lowered with the increase of fields in the block. Furthermore, because the length of each field is variable according to the length of the data, it is necessary to definitely indicate the dividing position between the fields. In the prior method, a special bit pattern is used for the ID sentinel for that effect. However, the special bit pattern of the ID sentinel is not sufficiently distinctive, so that reading errors can arise at a certain frequency.

In addition, since both the information type ID code and the data of the content of information are 2-character ID codes, and these 2-character ID codes must be decoded with reference to a general purpose ID code dictionary the general purpose ID code dictionary is necessary for all reading devices to understand the type and the content of the information read from the filmstrip. Since the reading devices must have a larger capacity memory to include the ID code dictionary, the cost of the reading devices is increased.

OBJECTION OF THE INVENTION

In view of the foregoing, a primary object of the present invention is to provide a magnetic recording method which solves the above problems and achieves a high efficient recording of various information on the magnetic recording layer of the filmstrip.

SUMMARY OF THE INVENTION

To achieve the above object, the present invention basically adopts the above-described construction of a block which is constituted of a block start code, at least one field and a block end code, which are represented by binary codes, and constructs each field such that a field start code is recorded in the beginning of the field to indicate the starting position of the field, and an ID code is recorded next to the field start code to indicate a plurality of types of information which are recorded in series in the field following the ID code. Because the ID code represents a plurality of information types in a composite form, it is unnecessary to provide an ID code to each information type. Therefore, many types of information are efficiently recordable in a limited length of one block.

According to the invention, the ID code is made by using a specific flag set memory. That is, the ID code is made based on binary code data having a predetermined bit number, which is temporarily set in the flag set memory. Each bit position of the binary code data is assigned to a predetermined type of information. A flag is set in each of those bit positions which correspond to the types of information to be recorded on the magnetic recording layer of the filmstrip. Thus, the binary code data is provided in a quite easy way, and the ID code made based on the binary code data exactly represents the types of information that follows it.

An item table is preferably utilized for correlating the binary code data with the information types. The item table stores information items or types in a predetermined sequence or arrangement along with the number of bits necessary for representing the content of the information of each type.

Since the variable length of each field can be determined with reference to the bit numbers stored in the item table in association with the information types indicated by the ID code, it is possible to distinguish the end of the field. Therefore, the dividing position between the fields is reliably determined.

By using a bit pattern that is included in the binary code data as a part of the ID code, the ID code will be made still more easily from the binary code data.

The information types which are represented by the ID code may exclude those which are always or necessarily recorded on the filmstrip. In this embodiment, the necessitated information is to be recorded in a predetermined position in a field, preferably immediately behind the ID code. Thereby, the necessitated information is recordable and readable independently from other types, i.e., optionally recorded information.

According to a preferable embodiment, various information types are grouped according to certain category, and one field contains the same group information. Corresponding to the item groups, there are provided several types field start codes, and one of these field start codes is selectively recorded in the beginning of each field. That is, the field start code also indicates the group of the information contained in the field, while the field length is not elongated compared with the case where the field start code merely indicates the starting position of the field.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein:

FIG. 3A is an explanatory view illustrating a format of a block recorded according to the present invention;

FIG. 3B is an explanatory view illustrating a format of a field of the block;

FIG. 9 is a conceptual view of a numerical data code table used for converting numerical data into binary codes;

FIG. 10 is a conceptual view of a character data code table for converting character data into binary codes;

FIG. 14 is a conceptual view illustrating the content of a field; and

DETAILED DESCRIPTION OF THE PREFERRED EMBODIMENT

Figure 1:
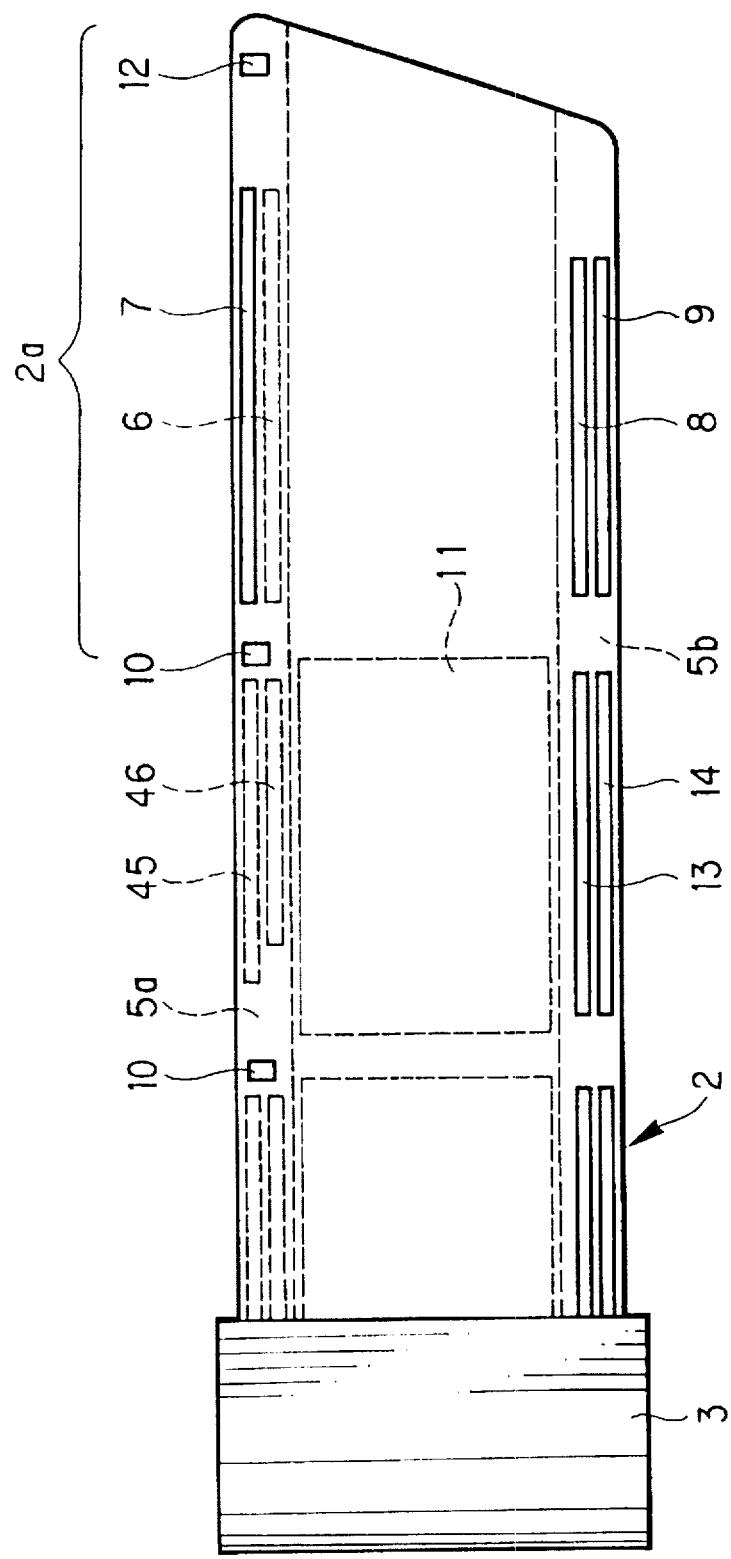
FIG. 1 is a schematic rear side view of a photographic filmstrip embodying the method of the present invention.
Figure 2:
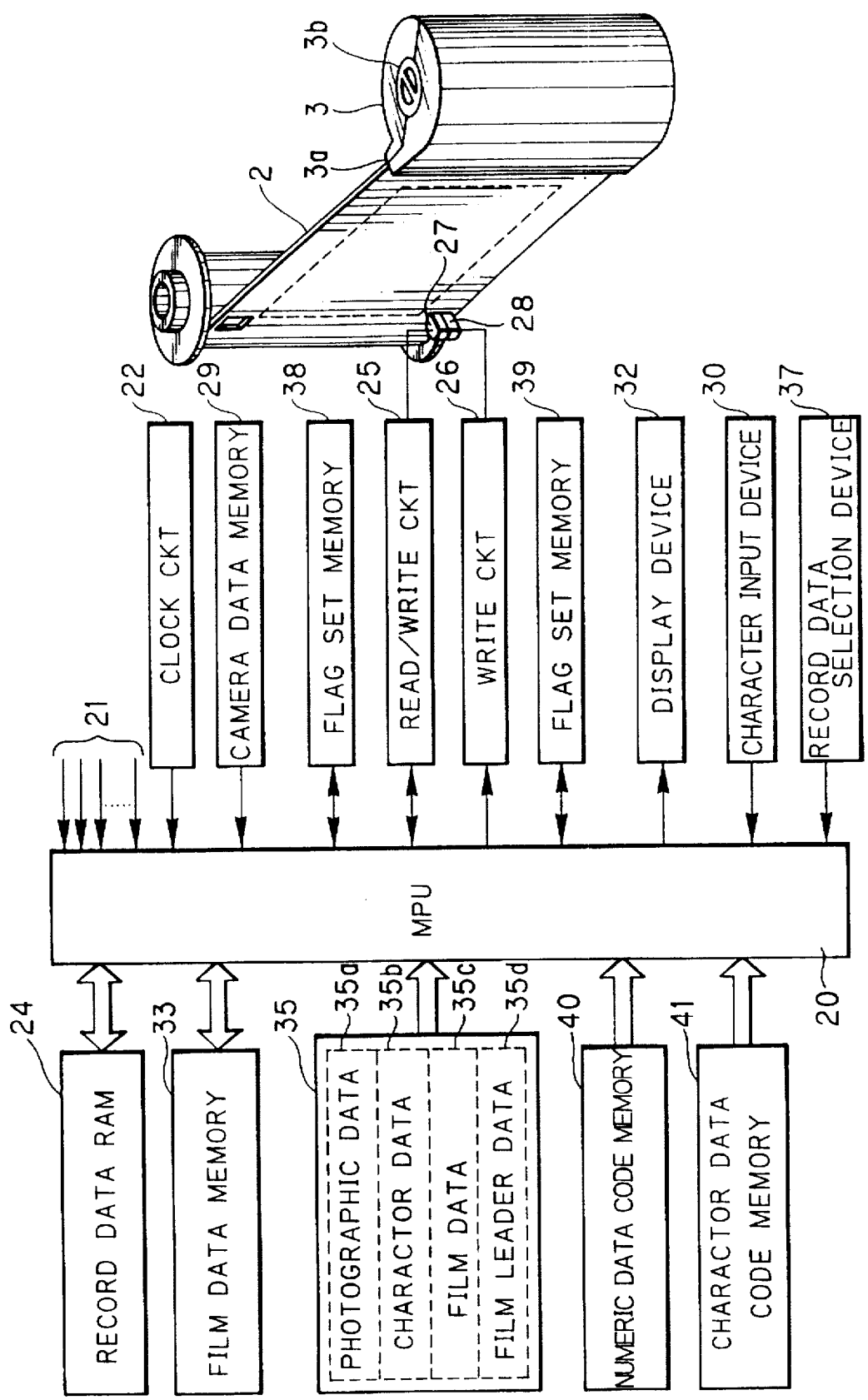
FIG. 2 is a block diagram of a magnetic read/write device of a camera embodying the method of the present invention.

FIGS. 1 and 2 show an example of a photographic filmstrip 2 capable of magnetically recording information thereon. A cassette shell 3 for containing the filmstrip 2 has a film advancing mechanism which permits advancing a film leader 2a of FIG. 1 to the outside through a port 3a by rotating a spool 3b in an unwinding direction. By virtue of the film advancing mechanism of the cassette shell 3, the whole length of the filmstrip 2 can be located inside the cassette 3 before and after exposure. Also after development, the filmstrip 2 is wound back into the cassette shell 3 to be preserved therein without the need for cutting into shorter strips. The cassette shell 3 containing the developed filmstrip 2 is returned to the customer.

In FIG. 1, magnetic recording layers 5a and 5b are formed on the back surface of the filmstrip 2 along longitudinal edges in a predetermined width each. Tracks 7 and 8, which are disposed in the film leader 2a, are recorded by a film manufacturer. The track 7 contains manufacturing data or photofinishing data for the filmstrip 2, such as the film manufacture number, the lot number of photographic emulsion, and code of photofinishing recipe. The track 8 contains film data of the filmstrip 2, such as film type, available number of exposures, ISO speed and other data about photographic properties.

FIG. 3A illustrates a conceptual view of a track recorded on the magnetic recording layers 5a and 5b of the filmstrip 2. A track constitutes a record block B, wherein a block start code "BSC" for indicating the beginning location of the block B is recorded at its starting end, which is followed by four fields, and finally a block end code "BEC" is recorded for indicating the end of the block. The codes and the fields are written in form of binary codes.

The four fields are independent from one another, and each has a structure as shown in FIG. 3B. A 8 (=1 byte) field start code "FSC" is recorded in the beginning of each field, and is determined by the type or group of information which follows it. First and second ID (identification) codes ID-1 and ID-2 indicate the items of the information contents contained in this field and the number of information items. As for the example shown in FIG. 3B, the ID-1 and ID-2 codes are read to identify the types or items of data DATA-1, DATA-2 and DATA-3 that follow the ID codes. At the end of each field, a parity check code or LRC (longitudinal redundancy check) code is recorded.

Information written on the recording tracks 7 and 8 is read in various states of the filmstrip 2. For example, when the filmstrip 2 is loaded in a camera, the film leader 2a is advanced out of the cassette shell 3, while the information on the track 8 is read by the camera and written in a memory of the camera. Information about the manufacture of the filmstrip 2 recorded on the track 7 may be useful for dealing with possible troubles. Information about the photofinishing recipe may be useful for photofinishers.

There are also spaces for recording tracks 6 and 9 under the previously recorded tracks 7 and 8 in the film leader 2a. The track 6 is used for recording information about customer's orders in a retail order station or agency when the filmstrip 2 is forwarded for photofinishing. The track 9 may be written by a magnetic recording device of a camera while the film leader 2 is advanced out of the cassette shell 3 in the camera, for recording a camera ID code, a camera owner ID code and so forth. Also in the tracks 6 and 9, information is written according to the format shown in FIGS. 3A and 3B.

The filmstrip 2 is provided with a perforation 10 per one original frame 11. The perforation 10 is detected by a photo-sensor of the camera to transport the filmstrip 2 one frame after each exposure. A perforation 12 disposed at the tip of the film leader 2a is used for detecting the tip in automatic advancing of the film leader 2a out of the cassette shell 3, as well as in automatic winding of the filmstrip 2 into the cassette shell 3.

While the filmstrip 2 is transported by one frame amount, the magnetic recording device of the camera write photographic data on the magnetic recording layer 5b in form of two tracks 13 and 14 along the just-exposed original frame 11 in the above-described format. The track 13 will contain information about photographic conditions such as the date of exposure, the focusing range etc. The track 14 will contain character information which can be entered by the photographer, e.g., a title of the picture, photographer's name.

Since magnetic recording layer can be transparent as is disclosed in the above mentioned U.S. patent, it is possible to form the transparent magnetic recording layer on the entire back surface of the filmstrip 2 to permit recording data on the back of the original frames 11 as well.

FIG. 2 also shows an example of the magnetic recording device of the camera. A micro processor unit (MPU) 20 is provided with a plurality of data input terminals 21, through which various photographic data is inputted from various devices of the camera, for example, as follows:

Print format from a print format changing device;

Flash fire data from a flash device;

Subject distance from an autofocus device;

Camera orientation from a camera orientation detector;

Subject brightness from brightness measurement device;

Stop value and shutter speed from an exposure control device;

Exposure correction value from an exposure correction device; and

ISO speed from an ISO speed adjusting device.

The print format changing device is to select the format (size and aspect ratio) of photographic print among from a standard size print (127 mm×89 mm), a wide vision size print (158 mm×89 mm) and a panoramic size print (254 mm×89 mm). For easy selection of the print format, a field of view changing device is mounted to change the field of view of the viewfinder among three aspect ratios which correspond to those of the above three print formats. Thereby, the photographer can select an appropriate print format while visually verifying the scene that will appear on the photographic print. Information about the selected aspect ratio from the field of view changing device is used as the print format data. If the print format data represents the wide vision size, a limited part (36 mm×20 mm) of the original frame (36 mm×24 mm) is used for printing. If the print format data represents the panoramic size, a limited part (36 mm×13 mm) of the original frame is used for printing.

The camera orientation detector detects the camera orientation, i.e., whether the camera is horizontal or vertical, and the angle of inclination. The brightness measurement device measures the subject brightness, and the exposure control device calculates a stop value and a shutter speed based on the subject brightness. The exposure correction device is operated to correct the automatically calculated exposure value in special cases where the principal subject would be improperly exposed with the that exposure value, e.g., in a rear light photography.

The MPU 20 also receives date and time information from a clock circuit 22, and writes the above-described photographic information and the time information in a recording data RAM 24 concurrently with a shutter release. The MPU 20 reads necessary data from the recording data RAM 24, and drives a magnetic read/write head 27 and a write head 28 through a read/write circuit 25 and a write circuit 26 to write the necessary data on the magnetic recording layer 5b in the format shown in FIGS. 3A and 3B.

A camera data memory 29 stores data specific to the camera, such as camera type, manufacturer name, manufacture number, maximum f-number of lens, and lens focal length. The camera data may also be recorded on the filmstrip 2, as the occasion demands.

Furthermore, a character input device 30 is provided to enter character information which can also be recorded on the filmstrip 2. The character input device 30 may be constituted of manual operation switches which are commonly used for setting or selecting a photographic mode or an exposure control mode, and a display device 32, e.g., an LCD panel. Also the display device 32 is commonly used for displaying other data, such as the film data previously written on the track 8 and read through the read/write head 27 during the film leader advancing. The display device 32 may display data necessary for photographing, such as the number of exposed frames, the selected print format and the selected mode. The film data read from the track 8 is stored in a film data memory 33.

Figure 4:
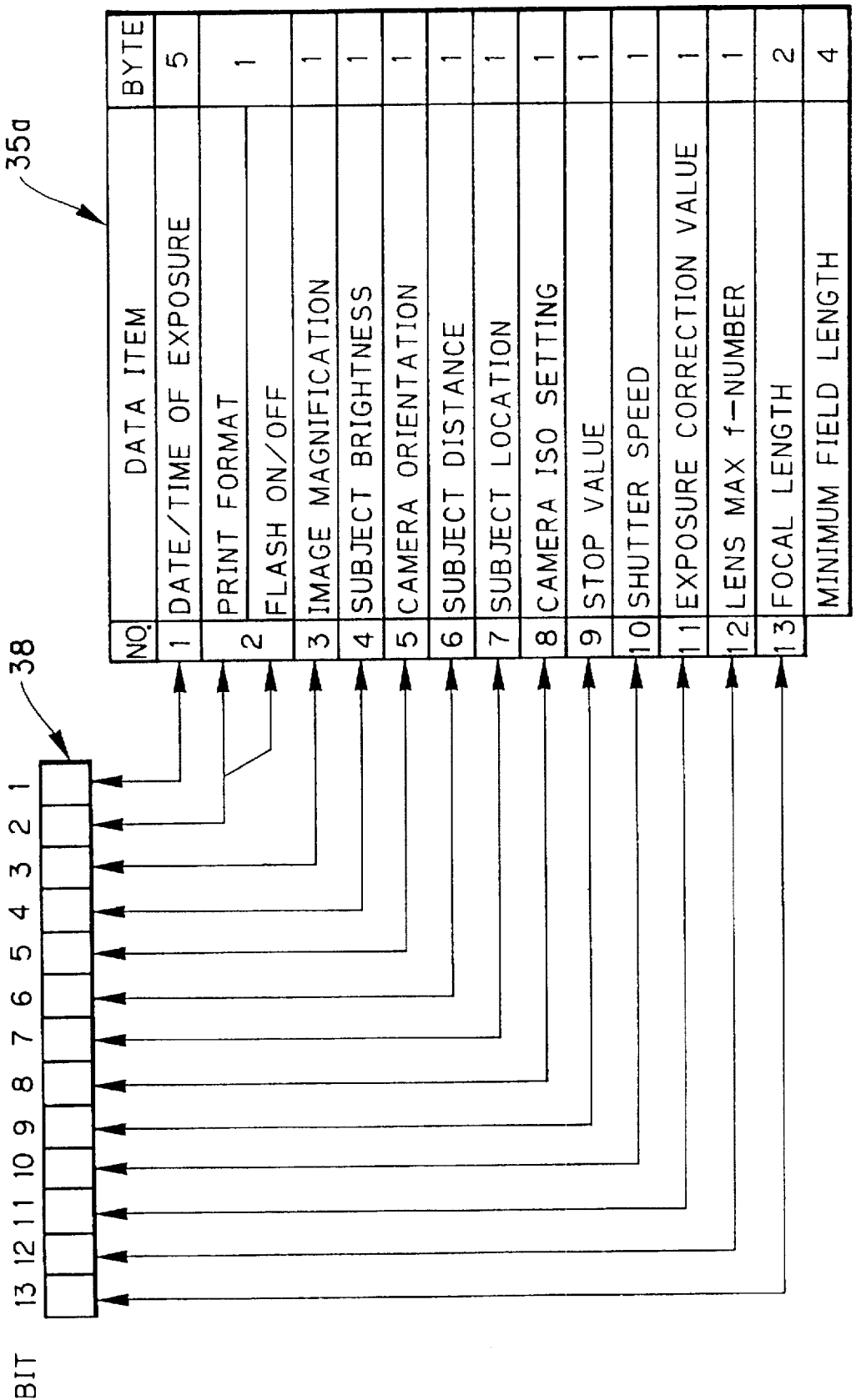
FIG. 4 is a conceptual view of an item table for photographic data.

A table memory 35 is a ROM which stores an item table 35a for use in the magnetic recording of the photographic data on the filmstrip 2 in association with each frame. The table 35a arranges the above-mentioned various photographic information items, for example, as shown in FIG. 4, along with the necessary number of bytes for representing the individual information content as a binary code. The information item of and its item number are predetermined independently from the camera. For example, in a camera being incapable of recording image magnification data, blank data is stored in association with the third information item. The item number "9" is always allocated to information about the stop value.

"Minimum field length" indicates the length of one field excluding information contents such as itemized in the table 35a. Since the FSC, ID-1 code, ID-2 code and LRC code are recorded in every field, and each of these codes uses one byte, the minimum field length is four bytes in the present embodiment. If a field always contains data having predetermined bytes and representing contents of predetermined information items, as will be described later, the predetermined bytes is included in the minimum field length.

Since the information items recorded in a field can be identified by the ID-1 and ID-2 codes, and the necessary byte numbers for respective information contents can be known from the item table 35a, the total length of a field can be determined by adding the minimum field length to the sum of the bytes of the recorded information contents. For example, the total length of the field FIELD-1 shown in FIG. 3B is eleven bytes. Accordingly, it is possible to discriminate between adjacent fields on the basis of the calculated total field length during reading.

The image magnification can be calculated as an approximate value by using the focal length stored in the camera data memory 29 and a subject distance detected by the auto focus device. Subject location, as the seventh information item of the photographic data, represents a segment of a photographic field in which a principal subject is located, when the photographic field is divided into several, e.g., five segments: central, upper left, lower left, upper right and lower right segments. The subject location may be the segment in which the distance signal is detected which the autofocus device adopts for focusing.

Figure 5:
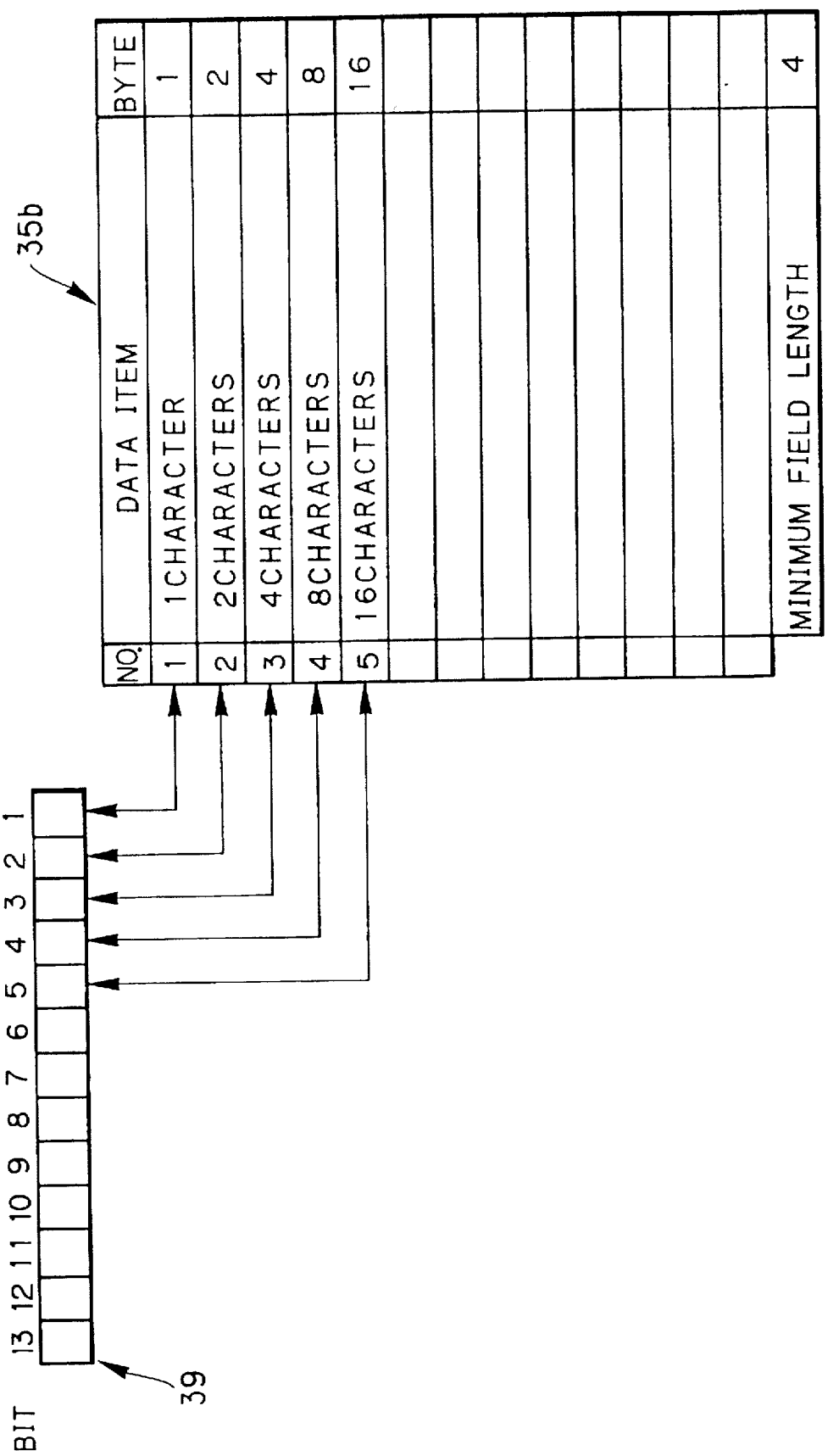
FIG. 5 is a conceptual view of an item table for character data.
Figure 6:
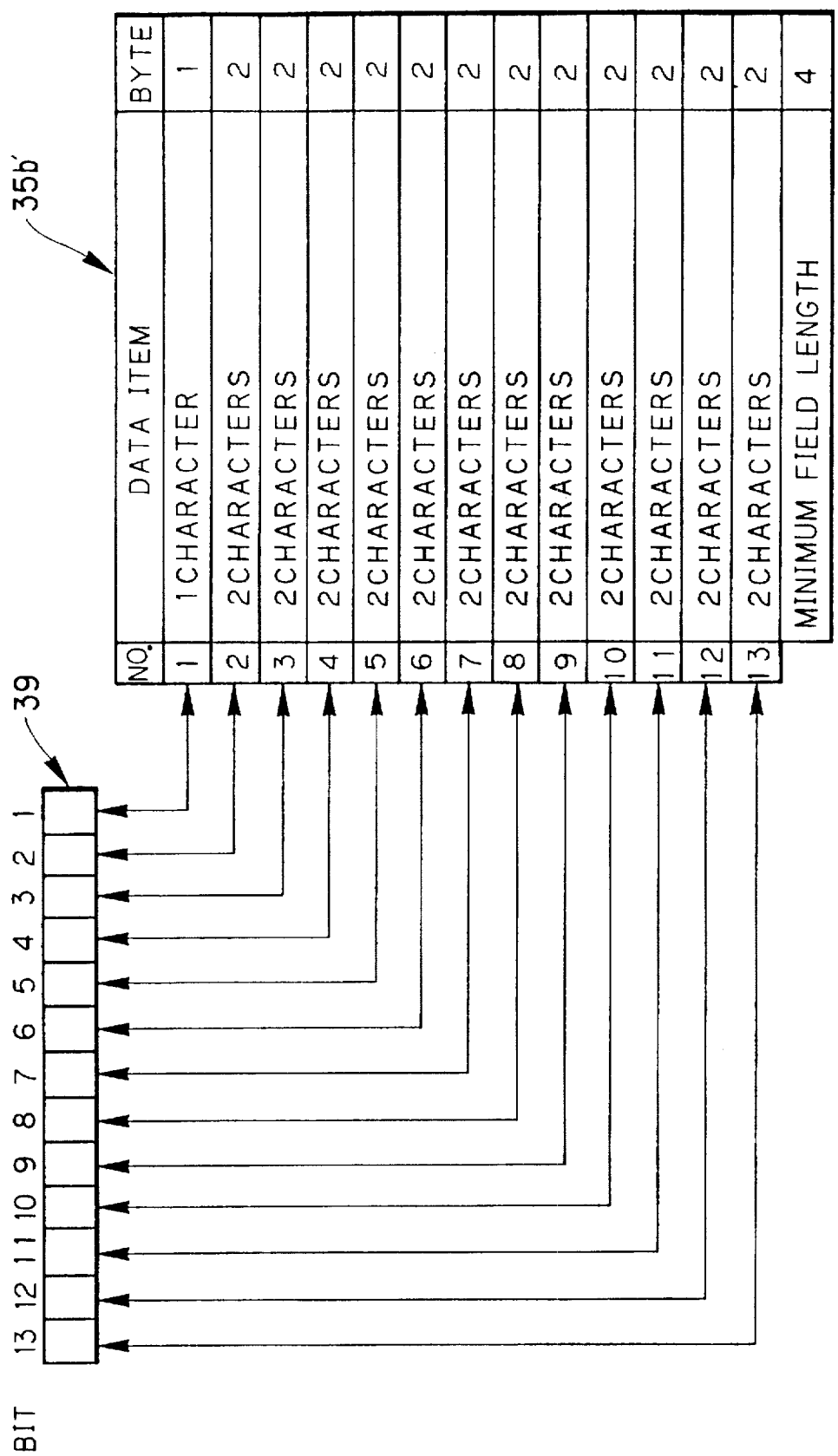
FIG. 6 is a conceptual view of another example of item table for character data.

The table memory 35 further includes an item table 35b for magnetic recording of the character data, an item table 35c for reading the film data, and an item table 35d for writing data on the track 9 of the film leader 2a. The table 35b has a structure as shown in FIG. 5, and is referred to for determining the number of characters included in a character string inputted through the character input device 30. Since one character is allotted one byte (eight bits), if the entered character string includes ten characters, data of second and fourth information items is used.

Figure 7:
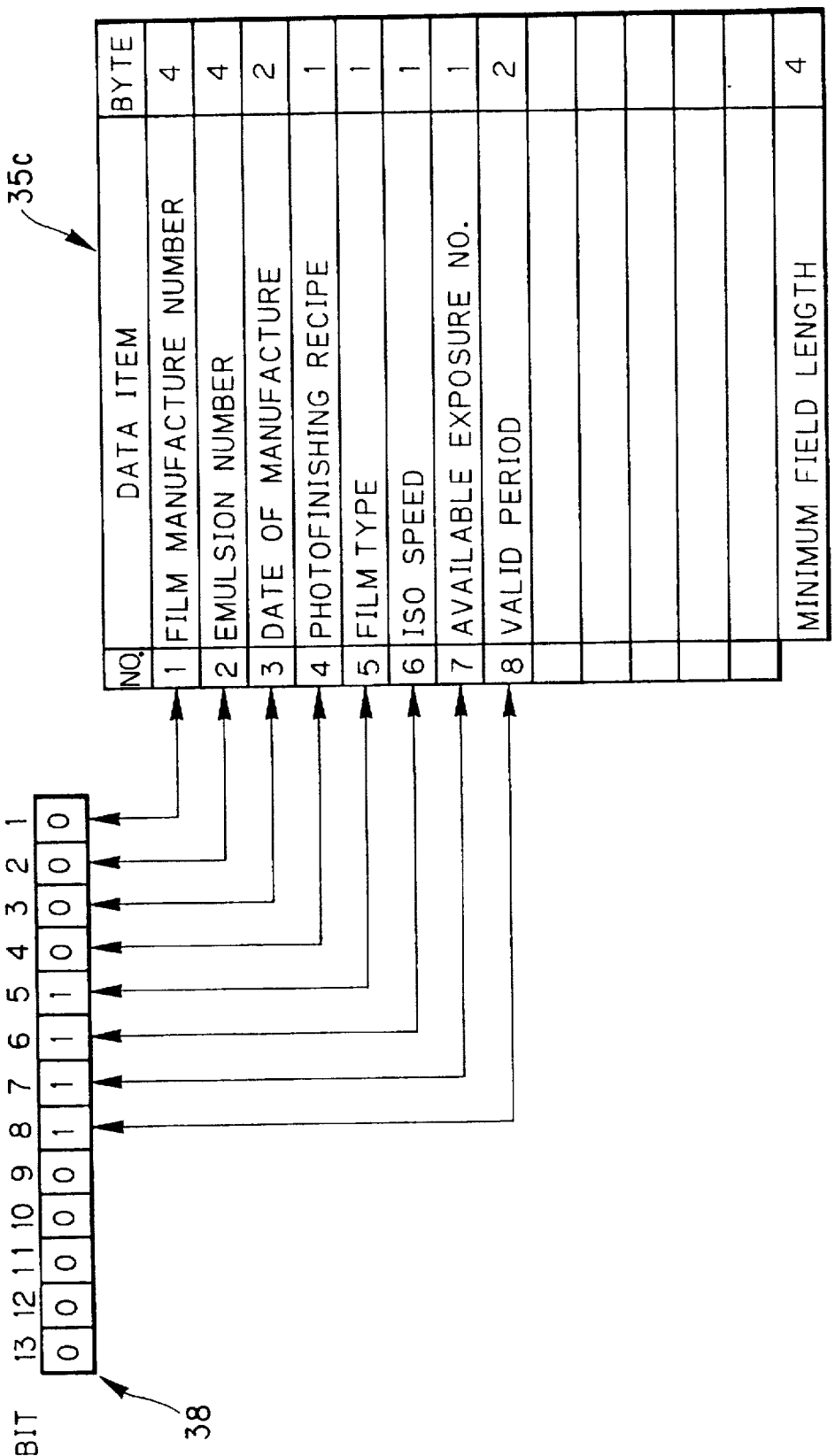
FIG. 7 is a conceptual view of an item table for film data.

In the table 35c for the film data, information about the filmstrip 2 such as manufacture data and the property data thereof is arranged in a manner as shown in FIG. 7, which is used for identifying the information read from the track 8. However, since the first to fourth information items are never used in the camera, the table 35c may contain blank data as for these information items.

The table 35d for the camera data includes as its information items, camera ID code representative of the type or name of the camera, the manufacturer of the camera, and a film roll number, that is, the serial number of filmstrips which are loaded in the camera in continuous succession. Although the magnetic recording on the filmstrip 2 is always performed in the same format as shown in FIGS. 3A and 3B, the field is distinguishable from each other during reading, there are different types field start codes FSC, so that a corresponding one of these field start codes is recorded at the start of each field depending on which table 35a, 35b or 35d is referred to for recording.

A recording data selector 37 is to select data to be recorded on the filmstrip 2 among from the above various photographic information and camera data. In case of a camera in which the number of information items listed on the table 35a is small, the recording data selector 37 may be omitted, and information contents relating to all information items may be recorded on the filmstrip 2. It is preferable to write the information about the date and time of exposure, and the print format on the filmstrip 2 in any case independently of the recording data selector 37. In that case, since the recording of these information items can be arranged in a main routine for the magnetic recording process, it is possible to omit these information items from the table 35a and add other items instead.

A flag set memory 38 is used to make an ID code corresponding to the information items which are selected to be written on the filmstrip 2 from among the items of the table 35a. The flag set memory 38 is constituted of a 13-bit register, as shown in FIG. 4. The bit number corresponding to the number of information items listed on the table 35a, and the bit position corresponding to the arrangement of the information item in the table 35a. If, for example, information items "date and time of exposure", "print format" and "subject distance" are designated to magnetic recording a flag "1" is set in first, second and sixth bit positions "1", "2" and "6", to provide a binary code "0000000100011". Because the print format data needs merely two bits, the print format data is combined with "flash ON/OFF data" under the same item number. The flash ON/OFF data represents whether the flash fired or not.

In the same way as the flag set memory 38) a flag set memory 39 is used when recording a character string on the filmstrip 2 by using the magnetic write head 28. As shown in FIG. 5, if the character string is constituted of ten characters, a flag "1" is set in the second and fourth bit positions "2" and "4", to make a binary code data "0000000001010" in the flag set memory 39.

A numeric data code memory 40 is a ROM which stores a numeric data code table as shown in FIG. 9, for converting numeric data into a 8-bit binary code wherein seven bits represent the data itself, while the eighth bit is a parity bit "P". If, for example, the numeric data is "48", a binary code "P1001100" is provided. The parity pit P is "1" or "0" depending on the number of "1" contained in the other seven bits of the 8-bit code, such that the 8-bit code always contains an odd number of binary numeral "1". In the same way, a character data code memory 41 stores a character data code table as shown in FIG. 10, for converting character data into a binary code according to a character array, e.g., a character array of ASCII code.

As seen from the code tables of FIGS. 9 and 10, some of those codes whose fifth to seventh bits are "0" are allocated to block start codes BSC, the block end code BEC, and field start codes FSC1, FSC2, FSC3, FSC4 and FSC5. Due to the above-described definition of the parity bit, the binary codes "00000010" (BSC), "00000100" (BEC) will not be used for representing other data, such as numeric data or character data.

FSC 1 to FSC5 are five different type field start codes which represent predetermined five different groups of information magnetically recordable on the filmstrip 2. According to the above-described definition of the parity bit, the bit patterns of the FSC 1 to 5 are "00001000" (FSC1), "10001001" (FSC2), "10001010" (FSC3), "00001011" (FSC4), and "10001100" (FSC5), respectively. As set forth above, one of the five FSC1 to 5 is recorded in the beginning of each field depending on the group of information contained in that field.

Figure 8:
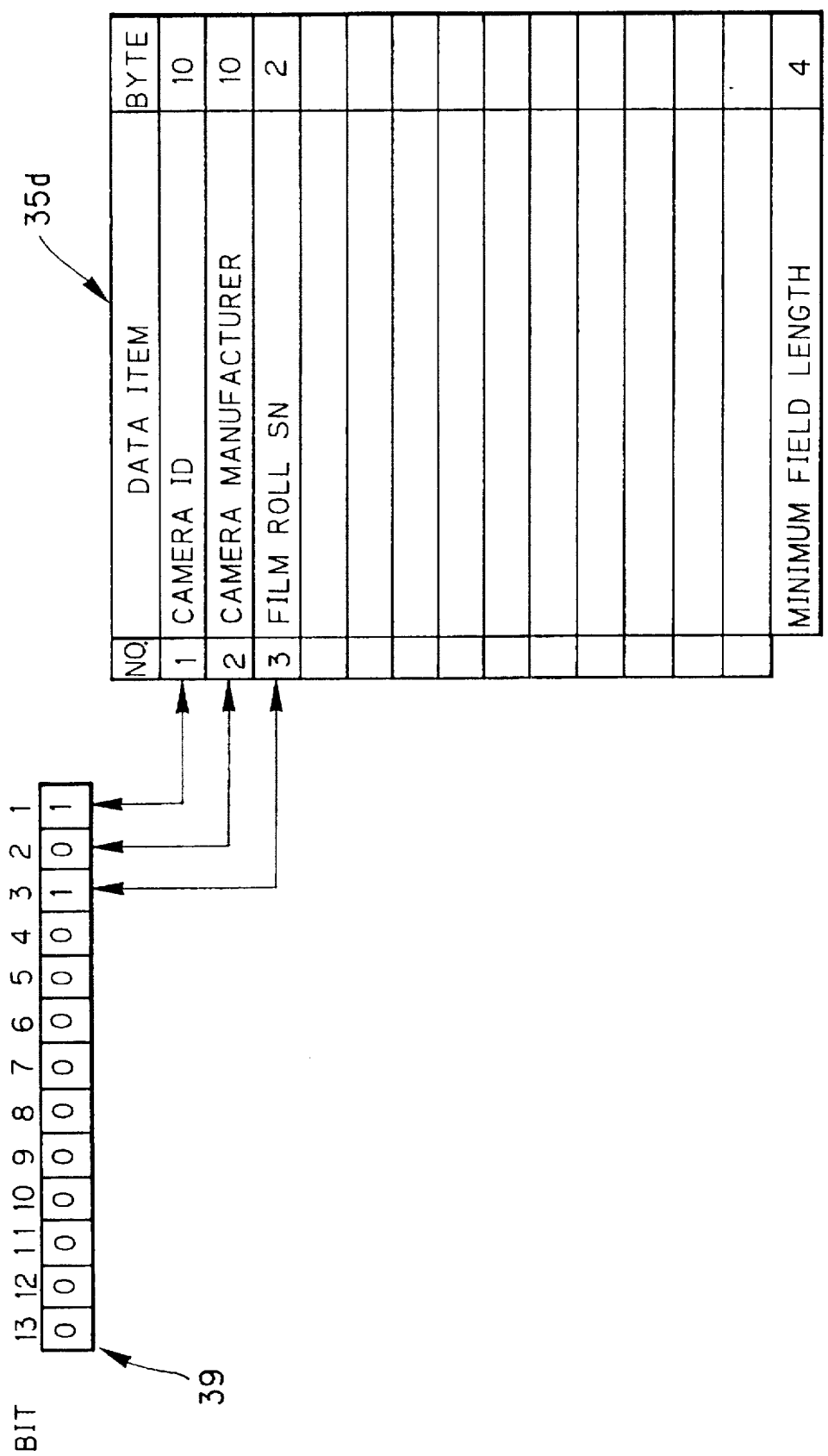
FIG. 8 is a conceptual view of an item table for use in reading and writing data on the film leader.

The recording information items are grouped as follows:

Information to be written after each exposure in association with each frame, such as listed on the table 35a, belongs to the first group. Information to be written on the track 9, such as camera ID code (table 35d of FIG. 8) belongs to the second group. The third group includes that information which is written on a track 45 of FIG. 13 in a retail order station, such as customer ID code, date and time of order entry, paper surface finish (glossy or mat) and print request data on reprinting. Also information written on a track 46 in a photofinisher, such as date and time of developing and/or printing, information about results of printing, reason code for improper printing, belongs to the third group.

The fourth group includes optional character information recorded in appropriate tracks at appropriate processing stages. The fifth group includes those information items which are listed on the table 35c of FIG. 7, such as film manufacture number, emulsion number, photofinishing recipe, film type, available exposure number and so forth.

ID-1 and ID-2 codes are respectively 8-bit binary codes, and are used to identify the items of information contents sequentially recorded in the field. If, for example, three types of information: "date and time of exposure", "print format" and "subject distance" are to be recorded in the first field FIELD-1, a binary code "0000000100011" is set in the flag set memory 38, as will be seen from the relationship between the table 35a and the flag set memory 38 in FIG. 4. The 13-bit binary code data is read by the MPU 20, and is converted into ID-1 code and ID-2 code according to a generating routine as illustrated in FIG. 11.

Data in the first to fifth bit positions "1" to "5" of the flag set memory 38 are transferred to the first to fifth bit positions "1" to "5" of the ID-2 code, while data in the sixth to tenth bit positions "6" to "10" of the flag set memory 38 is transferred to the first to fifth bit position "1" to "5" of the ID-1 code. Data "000" in the bit positions "13" to "11" of the flag set memory 38 is converted into 4-bit data "1010" according to a conversion table 45, of which data "10" is written in the bit positions "7" and "6" of the ID-1 code and data "10" is written in the bit positions "7" and "6" of the ID-2 code. The eighth bit "8" is used as a parity check bit in either ID-codes. According to the above-described definition of the parity bit, the binary code data "0000000100011" of the flag set memory 38 is converted into ID-1 and ID-2 codes "11000001:01000011".

Figure 11:
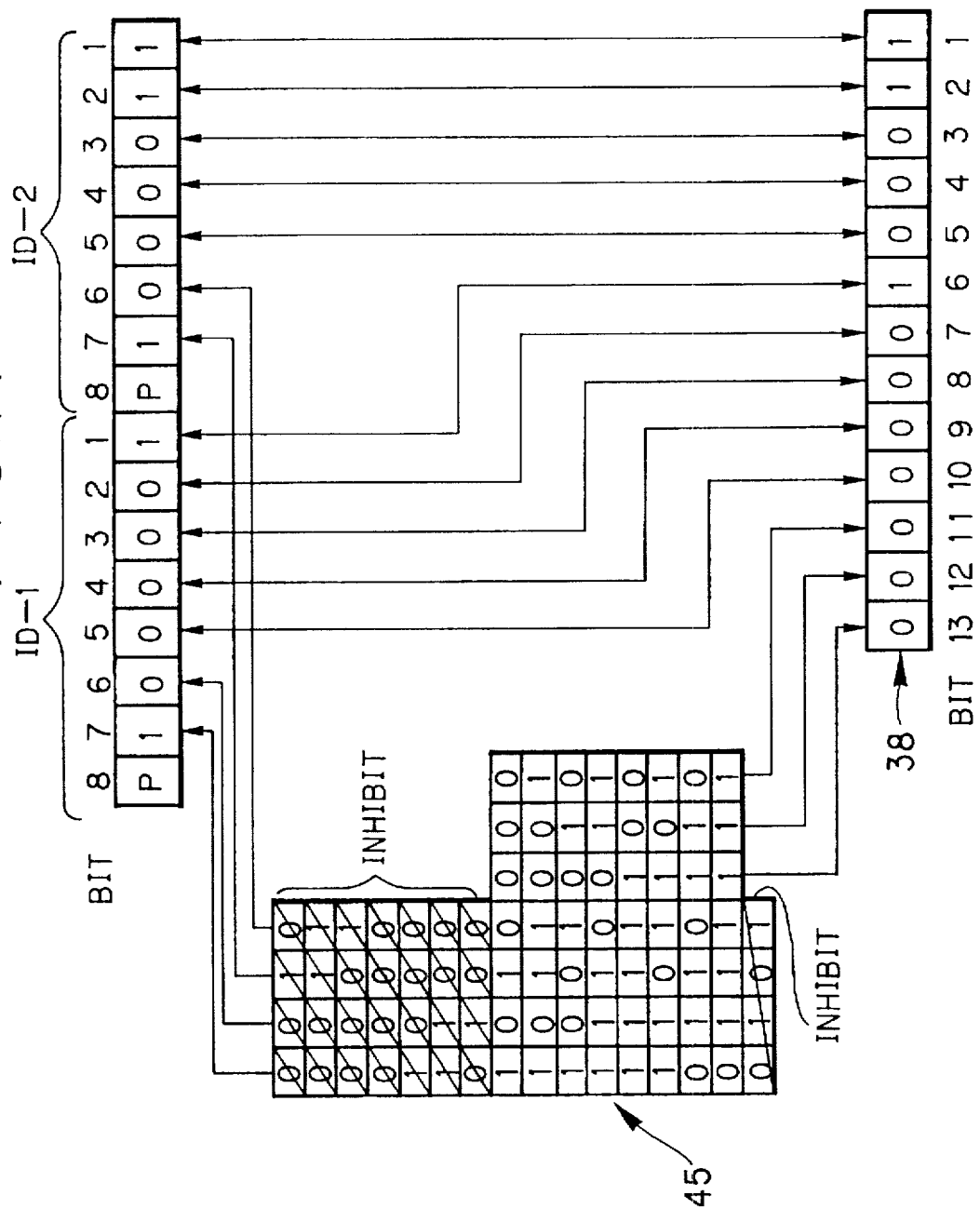
FIG. 11 is an explanatory view illustrating a conversion rule between binary code data and ID codes.

The conversion table 45 excludes several bit patterns that are shown as "inhibit" pattern in FIG. 11. This is to avoid having a bit pattern "000" in the fifth to seventh bit positions in the ID-1 and ID-2 codes, because the block start code BSC, the block end code BEC and the field start code FSC1 to FSC5 have that bit pattern "000" in the fifth to seventh bit positions. According to this generation rule, since at least one of the seventh and sixth bit positions of the ID-1 and ID-2 codes necessarily has data "1" whatever binary code data is made in the flag set memory 38, mistaking the ID-code with the code BSC, BEC and FSC1 to FSC5 is effectively prevented. Because only three most significant bits of the 13-bit binary code data are converted by the conversion table 45, and data in other bit positions of the 13-bit code is simply transferred to predetermined bit positions of the ID-1 and ID-2 codes, the ID-1 code and the ID-2 code can be easy to make.

As set forth above, the ID-1 and ID-2 codes "11000001:01000011" represent that information recorded in the first field relates to "date and time of exposure", "print format" and "subject distance". Following the ID-1 and ID-2 codes, three kinds of data DATA-1, DATA-2 and DATA-3 representative of the date and time of exposure, the print format and the subject distance are recorded in a sequence according to the order of arrangement in the table 35a. As shown in the table 35a, the data DATA-1 is 40 bits (five bytes), DATA-2 is eight bits (one byte) and DATA-3 is eight bits (one byte). The most significant bit of each byte is used as a parity bit.

The LRC code recorded at the end of the field has eight bits. The LRC code is to perform parity check to every bit position, assuming that the field may be divided into one-byte segments, and one byte is constituted of eight bits. For example, when the data DATA-1, DATA-2 and DATA-3 is represented by 40 bits, 8 bits and 8 bits, respectively, and hence the field FIELD-1 is totally 11 bytes (88 bits), data "1" or "0" is written in each bit of the LRC code depending on the number of data "1" contained in the corresponding bit positions of the 11 bytes of the field, such that the number of data "1" contained in the same bit position of the 11 bytes is always an odd number.

In the same way as the first field FIELD-1, a field start code, ID-1 and ID-2 codes, data representative of information and a LRC code are recorded in each of the second to fourth field FIELD-2 to FIELD-4. Although at most 13 types or items of information can be sequentially recorded in a field, since reliability of parity check using the LRC code is lowered if the total data length of one field goes beyond 20 bytes, it is preferable to divide one block into several fields, as is shown in FIG. 3A.

According to the above recording method, ID-1 and ID-2 codes definitely represent the plurality of items of information contained in the field, so that it is unnecessary to provide an ID code for each type of information. Therefore, a plurality of types of information can be recorded continuously in a sequence in one field, to obtain a high efficient recording in a block.

It is also possible to make ID-1 and ID-2 codes from the binary code data set in the flag set memory 38 by the following calculation. By weighting the bits of the 13-bit binary code data respectively with factors 1, 2, 4, 8, 16, . . . . 2048 and 4096 in the order from the least significant bit, the binary code data can be processed as 13-bit binary number, which represent 8196 different numbers "0" to "8195" in decimal notion. A single bit pattern corresponds to one of these numbers, and vice versa.

Also ID-1 and ID-2 codes may be dealt with as a pair of 8 binary numbers, but may have 112 variations of numbers "16" to "127" in decimal notation, since the bit pattern of the fifth to seventh bits of the ID code may not be given as "000". Also in this case, each number corresponds to a bit pattern in one-to-one relationship. Therefore, it is possible to convert a binary code data into ID-1 and ID-2 codes by an arithmetical operation, and vice versa, if only a relation is set up for one-to-one relationship between ID-1 and ID-2 codes and binary code data.

Providing that the 13-bit binary code data is dealt with as decimal numbers "0" to "8195", numerals in upper two digits are allocated to the ID-1 code, while numerals in lower two digits are allocated to the ID-2 code. If $[N]_{DEC}$ represents a numeric value of binary code data in decimal notation, $[ID\text{-}1]_{DEC}$ and $[ID\text{-}2]_{DEC}$ represent the numeric values of ID-1 and ID-2 codes in decimal notation, $[ID\text{-}1]_{DEC}$ and $[ID\text{-}2]_{DEC}$ may be obtained according to the following relations:

$$[ID\text{-}1]_{DEC} = ([N]_{DEC}/100) + 16 \tag{1}$$

$$[ID\text{-}2]_{DEC} = ([N]_{DEC} \text{MOD } 100) + 16 \tag{2}$$

wherein "/" represents division with round-off of the decimals, "MOD" means an operation to calculate a remainder. On the contrary, binary code data may be derived from ID-1 and ID-2 codes according to the following arithmetical operation:

$$[N]_{DEC} = ([ID\text{-}1]_{DEC} - 16) \times 100 + ([ID\text{-}2]_{DEC} - 16) \tag{3}$$

According to the above arithmetical operation, $[ID\text{-}1]_{DEC}$ will have a value range from 0 to 81, while $[ID\text{-}2]_{DEC}$ will have a value range from 0 to 99. Although this difference or unbalance between the value ranges is no problem in practice, it is preferable, for equalizing the value ranges of $[ID\text{-}1]_{DEC}$ and $[ID\text{-}2]_{DEC}$, to use "91" in place of "100" as an arithmetical shift coefficient in the above relation, since the value "91" is the integer that is the nearest to the square root of the maximum value "8191" of $[N]_{DEC}$. In that case, the relations may be given as follows:

$$[ID\text{-}1]_{DEC} = ([N]_{DEC}/91) + 16 \tag{4}$$

$$[ID-2]_{DEC}=([N]_{DEC} \text{MOD } 91)+16 \quad (5)$$

The relation for reversal conversion is as follows:

$$[N]_{DEC}=([ID-1]_{DEC}-16)\times 91 +([ID-2]_{DEC}-16) \quad (6)$$

In general, when ID-1, ID-2... ID-n codes constitute an identification code (n=1, 2, ...), each ID code may be operated as a binary number. If [ID-n] represents the numeric value of the binary number of the ID-n code, and [N] represents a binary number of binary code data, the relation therebetween may be given as follows:

$$[N] = \sum_{i=1}^{n} ([IDi] - \alpha i) \times \beta^{n-i} \quad (7)$$

wherein $\alpha i$, $\beta < n^b$, b=bit number of ID code.

Since the embodiment shown in FIGS. 1 to 11 relates to a case where n=2, b=8, the equation (3) corresponds to the equation (7) in decimal notation, when $\alpha i=16$ and $\beta=100$.

Figure 12:
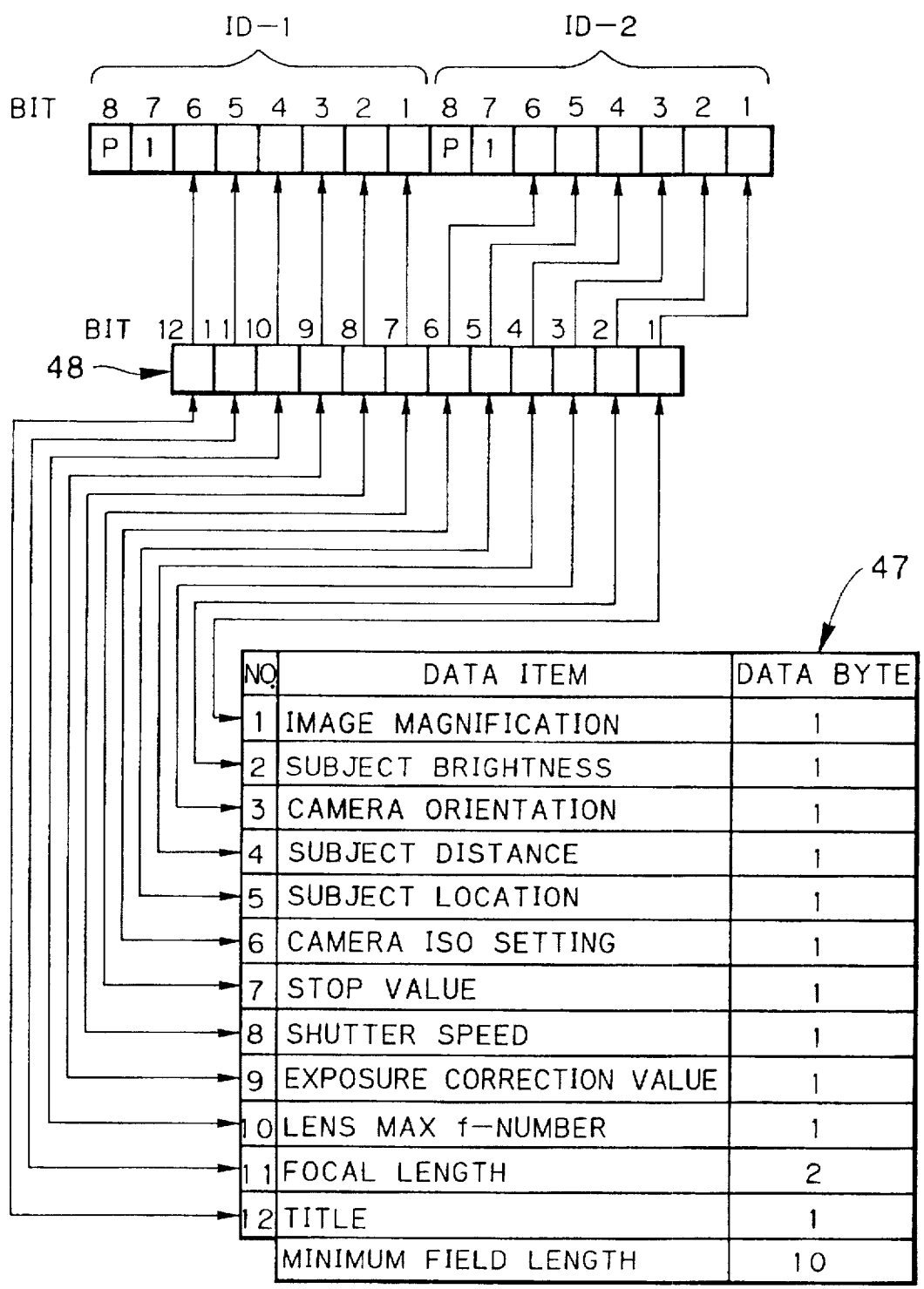
FIG. 12 is an explanatory view illustrating a conversion rule between binary code data and ID codes according to another embodiment of the invention.

As set forth above, it is preferable to always write the information about the date and time of exposure and the print format on the filmstrip 2 independently of the recording data selector 37. In that case, since the recording of these information items can be included in a main routine for the magnetic recording process, it is possible to omit these information items from the table 35a and add other information items instead. FIG. 12 shows an embodiment of such a table 47 which excludes information items "date and time of exposure" and "print format", as necessarily recorded information items, and includes other twelve information items in a predetermined arrangement. In this embodiment, a 12-bits flag set memory 48 is adopted, of which all bit positions are associated with six least significant bits of ID-1 code and ID-2 code, in one-to-one relationships. The seventh bit of the ID-1 and ID-2 codes is always "1", for easy discrimination from the block start code BSC, the block end code BEC, and the field start codes FSC. The eighth bit of each ID code is a parity bit.

In the magnetic recording using the table 47, since the date and time of exposure (five bytes) and the print format (one byte) are always recorded, the minimum field length will be ten bytes, including the above six bytes plus four bytes consisting of the field start code FSC (one byte), ID-1 and ID-2 codes (two bytes) and the LRC code (one byte). The information items about the date and time of exposure and the print format are determined to be written between the ID-2 code and other optionally recorded information in a predetermined sequence.

To record some information items always on the filmstrip 2 is not limited to the above described embodiment using the generation rule shown in FIG. 12, but may be applicable to those embodiments where ID-1 and ID-2 codes are made by means of the conversion table shown in FIG. 11 or the arithmetical operation, in the same way as above. In these alternative, it would be easier to rewrite a binary code data into ID-1 and ID-2 codes without the need for a special generation rule. An information item "title" means a title recorded for each frame, which is manually selectable among from predetermined several titles stored in a memory of the camera.

Figure 13:
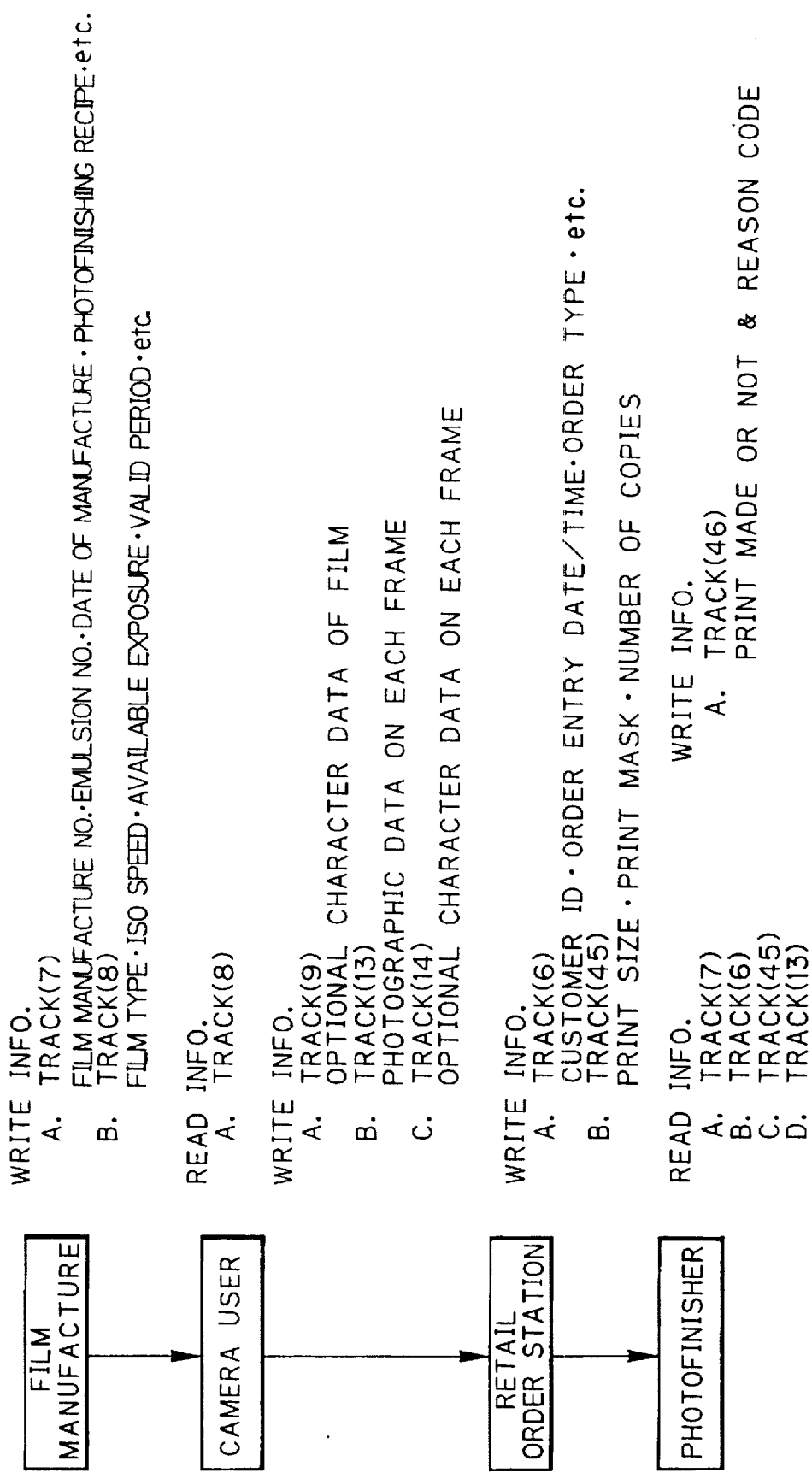
FIG. 13 is an explanatory view illustrating reading and writing information in respective stages of the photographic process.

Now, the application of the above described recording method to several stages of photographic film processing will be described with reference to FIG. 13.

First, the film manufacturer records a film manufacture number, an emulsion number, the date of manufacture, photofinishing recipe and so forth on the track 7 during manufacturing the filmstrip 2. The recording on the track 7 is performed according to the format shown in FIGS. 3A and 3B by using a table equal to the table 35c shown in FIG. 7, while using the field start code FSC5 for indicating that the information recorded thereon belongs to the fifth group. The recorded information can be utilized for production management. The information about photofinishing recipe may be utilized by a photofinisher. The film manufacturer further records film data such as film type, ISO speed, available number of exposures, on the track 8 in the same format.

When a lid of a camera is closed after the cassette 3 containing the entire length of the filmstrip 2 therein is loaded in the camera, the spool 3b is rotated by a film advancing mechanism in an unwinding or film advancing direction. As a result, the film leader 2a of the filmstrip 2 is advanced out of the cassette 3 toward a take-up spool of the camera. After the film leader 2a is wound around the take-up spool, the filmstrip 2 is advanced by the rotation of the take-up spool. During the film leader advancing, the read/write circuit 25 is set in a read mode, wherein the magnetic head 27 is ready to read.

The track 8 constitutes one block B as shown in FIG. 3A, and the block start code BSC is recorded in the beginning of the block B. When the magnetic head 27 reads the block start code BSC, the magnetic head 27 continues to read the information on the track 8.

When the magnetic head 27 reads the field start code FSC5, the binary code data "10001100" of the FSC5 is decoded in the MPU 20 to identify as the information recorded by the film manufacturer. Next, ID-1 and ID-2 codes are read. If the ID codes are "11000111:11010000", the MPU 20 sets a 13-bit binary code data "0000011110000" in the flag set memory 38 by using the conversion table 45 shown in FIG. 11.

Then, the MPU 20 refers to the table 35c shown in FIG. 7 in response to the field start code FSC5, to collate the bit positions having data "1" in the flag set memory 38 with the information items of the table 35c. Since data "1" is set in the fifth to eighth bit positions, in this instance, the MPU 20 determines that four information items "film type", "ISO speed", "available exposure number" and "valid period" are recorded in series following the ID-1 and ID-2 codes.

Since the table 35c also shows that four pieces of data representative of these four information items have one byte, one byte, one byte and two bytes, respectively, and that the minimum field length is four bytes, the MPU 20 can determine that the total length of this field is nine bytes, and the LRC code is recorded in the last, i.e. ninth byte. Therefore, parity check using the LRC code is performed accurately, so that error correction reliability is improved.

The film data read from the track 8 is written in the film data memory 33, while being simultaneously displayed on the display device. Therefore, the camera user can refer to the data for photographing. It is also possible to automatically set up the ISO speed adjusting device and a film frame counter of the camera. When the magnetic head 27 reads the block end code BEC from the track 8, the read/write circuit 25 is switched to a write mode. Thereafter, the film leader advancing is complete to position the first frame segment behind the exposure aperture of the camera, making ready for photographing.

Also the second group information which are listed on the table 35d (FIG. 8) may be written on the track 9 during the film leader advancing. When writing the second group information, first the block start code BSC is written, next the field start code FSC2 is written in the beginning of a field, and ID-1 and ID-2 codes follow it. If a camera ID code (a production name code) and a film roll serial number are to be written, binary code data "0000000000101" is set in the flag set memory 39.

The MPU 20 makes the ID-1 and ID-2 codes "01000000:01000101" on the basis of this binary code data by using the same generation rule as shown in FIG. 11. The magnetic head 28 records the ID-1 and ID-2 codes right after the field start code FSC2. The MPU 20 converts the camera ID code, which is stored in the camera data memory 29, and the film roll serial number, which is entered by the photographer just before film loading, into binary codes according to the code tables FIGS. 9 and 10. The binary codes are written by the magnetic head 28 after the ID-2 code. Thereafter, the LRC code and the block end code BEC are written to complete the track 9.

When the first frame has been exposed, the MPU 20 reads photographic data through the data input terminal 21, and write the data in the recording data RAM 24. If the photographer wishes to record appropriate characters for one frame, the character input device 30 is operated to that effect before the exposure of each frame. The inputted character data is also stored in the recording data RAM 24. The magnetic heads 27 and 28 are driven to record the photographic data under or along the just exposed frame, while the filmstrip 2 is advanced by one-frame amount. The information recordable under each frame by the magnetic head 27 is limited to the first group information listed on the table 35a, and the information recordable under each frame by the magnetic head 28 is limited to character string optionally inputted by the photographer. Therefore, the track 13 contains the photographic data, and the track 14 contains the character string information.

The track 13 is constituted of a block B wherein the block start code BSC is recorded at first, and the field start code FS1, ID-1 and ID-2 codes are recorded thereafter. If the information items of the photographic data to be recorded are "date and time of exposure", "print format", "subject distance" and "exposure correction value", binary code data "0010000100011" is set in the flag set memory 38 with reference to the table 35a. The binary code data is converted according to the generation rule of FIG. 11 into ID-1 and ID-2 codes "11000001:11100011".

After the magnetic head 27 records these ID-1 and ID-2 codes, the MPU 20 retrieves data about the date and time of exposure, the print format, the subject distance and the exposure correction value from the recording data RAM 24, and converts numeric values of these information items into binary codes with reference to the numeric data code table of FIG. 9. The consequent binary codes are recorded following the ID-1 and ID-2 codes by the magnetic head 27. Finally, the LRC code is recorded to complete the first field FIELD-1 of this block. FIG. 14 shows the content of the first field FIELD-1. To record further information for the same frame, the second field is made in the same way as above.

As for the track 14, since the information recorded thereon is character information, the field start code FSC4 is written next to the block start code BSC. When the number of entered characters is ten, binary code data "0000000001010" is set in the flag set memory 39 according to the table 35b of FIG. 5. The binary code data is converted into ID-1 and ID-2 codes "01000000:01001010" according to the generation rule of FIG. 11. After recording the ID codes, character data converted into a binary code according to the character data code table of FIG. 10, the LRC code and the block end code BEC are written in this order on the track 14.

In the same way as above, the tracks 13 and 14 are recorded under each frame 11 after exposure. When all available frames have been exposed, the filmstrip 2 is wound back into the cassette shell 3. Then, the camera user removes the cassette shell 3 from the camera and forwards it to a retail order station usually for developing and printing.

Also the retail order station uses the recording method of the present invention, so as to magnetically record information about the order on the track 6 in the film leader 2a. Such information about the order may be the customer ID, date and time of order entry, whether developing-and-printing or reprint, if there is any special print, and so forth. In case of special print or reprint, information about the type of the special print, such as a large size print, and/or the frames to be printed in that way is recorded on the track 45 in association with the individual related frame.

For this purpose, the retail order station is provided with a specific magnetic read/write apparatus for recording order information on the track 6 or 45 by operating a keyboard. Since the cassette shell 3 is capable of advancing and rewinding the filmstrip 2 by rotating the spool 3b in unwinding and winding directions, respectively, the magnetic recording can be easy to perform without the need for putting the filmstrip 2 in the dark, if the magnetic read/write apparatus has a main portion which is constructed similar to the above-described camera having magnetic read/write function, but excludes the exposure mechanism, and the keyboard is connected to the main portion.

Figure 15:
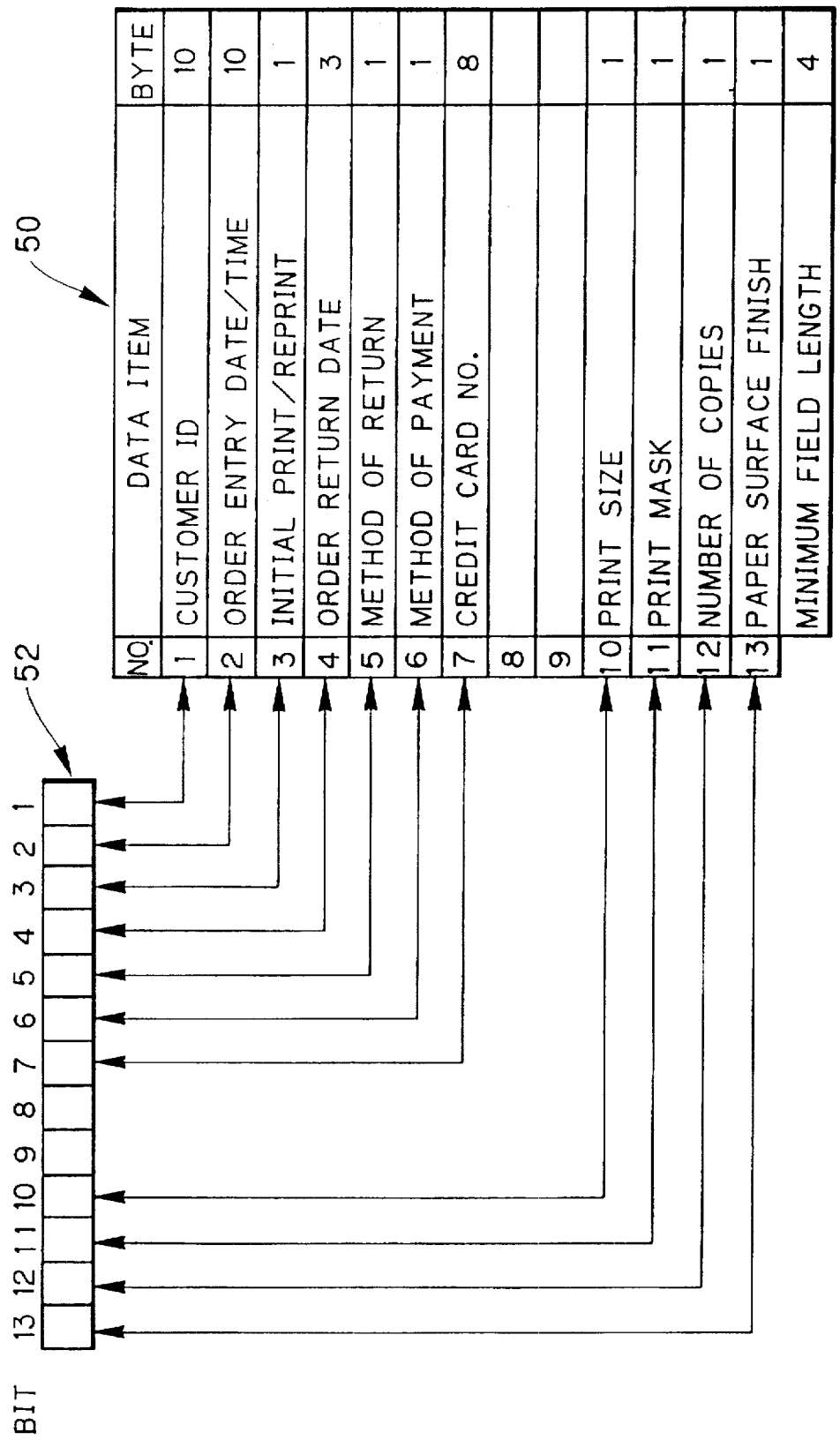
FIG. 15 is a conceptual view of an item table for use in reading and writing information in a retail order station.

FIG. 15 shows an example of table built in the magnetic read/write apparatus of the retail order station. The table 50 is used in combination with a flag set memory 52, in the same way as the above-described other tables. When recording information items listed on the table in a field, the field start code FSC3 is recorded at the beginning of the field, to identify that the following information is of the third group. Each information item of the table 50 is allocated to a bit position of the flag set memory 52 in one-to-one relationships, so that binary code data is set in the flag set memory 52 in correspondence with the number of items of recorded information and the order of arrangement thereof.

The binary code data is converted into ID-1 and ID-2 codes according to the same generation rule as shown in FIG. 11, and the ID-1 and ID-2 codes are recorded following the field start code FSC3. After the ID-1 and ID-2 codes, data representative of contact of the information and the LRC code are recorded in this order in the same format as shown in FIGS. 3A and 3B. To convert the content of the data into binary codes, the same code tables as shown in FIGS. 9 and 10 are used in the magnetic read/write apparatus.

The information of item numbers "1" to "7" is to record on the track 6 in the film leader 2a, wherein "customer ID" represents the name or code number of the customer, and "method of return" indicates whether the finished prints are to be returned to the customer by hands, by air mail, or by another means. "Method of payment" indicates whether the charge for developing and printing will be paid in cash or on credit. In the latter case, the credit card number is also recorded thereafter.

The information of item numbers "10" to "13" is to record on the track 45 per frame. For recording on the track 45, also the field start code FSC 3 is used to indicate that the following information is recording according to the table 50. "Print size" represents one of various sizes of photographic paper, such as a regular size (including the standard size, the wide vision size and the panoramic size), a cabinet size, a whole plate size and so forth. "Print mask" indicates whether a white frame is necessary or not, or a special edge is required. "Number of copies" indicates the number of prints per negative frame, and the number "0" is recorded for the frame unnecessary to print. "Paper surface finish" indicates whether the surface of the print should be glossy or mat.

After being recorded with the above information in the retail order station, the filmstrip 2 contained in the cassette shell 3 is sent to a photofinisher. The photofinisher uses a printer having a magnetic reading device and a magnetic recording device, which are disposed in the proximity of the entrance and the exit of the printer, respectively. The magnetic reading device includes at least the table 35a for photographic data, the table 35c for film data, the table 50 identical to that used in the magnetic read/write apparatus of the retail order station, and the data code tables shown in FIGS. 9 and 10. The magnetic recording device includes at least the table 35b for character data and the character data code table shown in FIG. 10.

It is possible to read the tracks 6 and 7 to check the information written in the retail order station and by the film manufacturer before development by using a separate magnetic reading device which may have the same construction as the reading device of the printer. Since the field start code FSC3 is written in the beginning of the field of the track 6, information is read from the track 6 with reference to the table 50. The track 7 has the field start code FSC5 at the beginning of the field, so that information is read from the track 7 with reference to the table 35c. If it is determined based on the information from the track 6 that developing-and-printing is required, the filmstrip 2 is subjected to developing and then printing. If reprint is required, the filmstrip 2 is directly set in the printer. "Photofinishing recipe" written on the track 6 may be utilized for development.

When the cassette shell 3 containing the developed filmstrip 2 is set in the printer, the spool 3b is rotated to advance the filmstrip 2 to the outside of the cassette shell 3, and the frames are seriatim set in a negative mask. During advancing the filmstrip 2 by one-frame amount, information is read from the tracks 13 and 45.

Since the field start code RSC1 is recorded in the beginning of the field contained in the track 13, the table 35a is referred to for identifying information items recorded therein, such that the subsequent ID-1 and ID-2 codes are converted into binary code data representative of the information items. Among of these information items of the table 35a, "print format", "subject location" and "exposure correction value" may be utilized for printing.

The information about print format is used for selecting a print magnification and a paper mask size. For example, if a panoramic size print is designated by the print format changing device of the camera, the magnification of a printing lens is switched to a value twice a value for the standard size print, and a paper mask having an aperture of 254 mm×89 mm is selected. The information about the subject location and the exposure correction value may be used as correction data when determining a print exposure amount based on a light measurement of the printer. Also information about the date and time of exposure, which may be read from the track 13, may be used for printing date and time along with the picture on the photo-print by using a character printing device of the printer.

On the other hand, since the field start code FSC3 is recorded in the beginning of the field contained in the track 45, the table 50 is referred to for identifying information items recorded in this field, on the basis of binary code data obtained from the ID-1 and ID-2 codes which follow the field start code FSC3. Among of the information items which may be recorded in the retail order station, "print size", "print mask", "number of copies" and "paper surface finish" are utilized for printing. Automatic reading and processing of these information items contributes largely to printing efficiency. The information about the paper surface is sent to a photographic processor to finish the paper surface according to this information.

If the information about the print size designates the regular size photographic paper, a regular type printer may be commonly used for making the standard size, the wide vision size and the panoramic size prints. However, if the cabinet size or other special size is designated, it is necessary to use a printer which is loaded with a wide strip of photographic paper. Also a photo-print having a special edge is required in the "print mask" information, the photo-print must be made by batch processing using another printer.

If it is found that any frame required to be printed cannot be properly printed, the magnetic recording device of the printer records character information on the track 46 under the frame to indicate that printing of this negative frame is canceled. For recording the character information, the table 35b is used, and the field start code FSC4 is recorded in the beginning of the field. For example, the character information of making no print is "NG *", wherein "*" means one of predetermined codes representing the reasons for canceling printing.

While the above-described embodiment reads information about an individual frame immediately before printing the frame, it is possible to read information of all the frames of one filmstrip 2 at once before the printing, and store the information in a supplementary memory, e.g., a magnetic recording sheet, so that the information is read from the supplementary memory for each frame during printing.

After the completion of photographic processing in the photofinisher, the developed film and the photo-prints are sent back to the retail order station. Then, information written by the photofinisher is read from the track 46, to automatically make a bill, or other purpose. It is possible to confirm the customer ID, the date of return of order, the method of payment, and other information by reading the track 6. Therefore, efficiency and reliability are improved on delivery. It is also easy to print out a hard copy of data list of information recorded on the track 14 in accordance with the customer's request.

Although the present invention has been described in detail with respect to the embodiments shown in the drawings, the present invention should not be limited to these embodiments. For example, many other information items than the above examples may be recordable on the magnetic recording layers 5a and 5b. ID code for identifying information items recorded in the following field may be allotted more than two bytes. By making an appropriate generation rule between binary code data and ID code, the ID code having three, four or five bytes could generate binary code data whose maximum number of bits, that is, the maximum number of information items, would be 20, 27 or 34, respectively. Therefore, a high recording efficiency can still be achieved compared with the conventional method wherein an ID code is used for each information item.

Thus, various modifications to the present invention may be used without departing from the scope of the invention as defined by the appended claims.

What is claimed is:

1. A magnetic recording layer formed on a photographic filmstrip, comprising:

a block recorded on a longitudinal track, said block comprising a block start code at a leading end thereof, a block end code at a trailing end thereof, and at least one field between said block start code and said block end code; and said at least one field comprising a field start code at a leading end thereof, a series of information segments relating to a plurality of information items and being arranged in a predetermined order, and an identification code disposed between said field start code and said information segments, said identification code representing binary code data having a predetermined plural number of bits, each position of said bits of said binary code data being assigned to a corresponding one of said plurality of information items, a first value of each of said bits indicating that the content of said corresponding one of said information items is recorded as one of said information segments and a second value of each of said bits indicating that the content of said corresponding one of said information items is not recorded as one of said information segments.

2. A magnetic recording layer as recited in claim 1, wherein said binary code data is decoded with reference to an item table, said item table storing said predetermined information items in an arrangement corresponding to said bit positions of said binary code data, along with a necessary bit length needed for representing the content of each said information item to be recorded as one of said information segments.

3. A magnetic recording layer as recited in claim 2, wherein said information segments are recorded in said field in a sequence according to the order of arrangement of said recordable information items in said item table.

4. A magnetic recording layer as recited in claim 1, wherein said identification code has a bit pattern which partly coincides with a bit pattern of said binary code data.

5. A magnetic recording layer as recited in claim 4, wherein a part of said identification code is equal to a part of said binary code data, and a further part of said identification code is made by converting a further part of said binary code data such that said identification code is prohibited from having a same bit pattern as that exhibited by said block start code, said block end code or said field start code.

6. A magnetic recording layer as recited in claim 5, wherein said binary code data has 13 bits, and said identification code is constituted of a pair of 8-bit codes, wherein the first to fifth bits of said 8 bit codes respectively coincide with the first to fifth bits and the sixth to tenth bits of said binary code data, the eighth bit of said 8-bit codes is assigned to a parity check bit, and the sixth and seventh bits of said 8-bit codes are determined based on the three most significant bits of said binary code data, such that the fifth to seventh bits of said 8 bits of said 8-bit codes are prohibited from having a pattern that is used for the fifth to seventh bits of said block start code, said block end code or said field start code.

7. A magnetic recording layer as recited in claim 4, wherein a part of said identification code is equal to at least a part of said binary code data, and a remaining part of said identification code is constituted of a parity check bit and at least a bit which has a constant binary numeral independently of said binary code data.

8. A magnetic recording layer as recited in claim 7, wherein said binary code data has 12 bits, and said identification code is constituted of a pair of 8bit codes, wherein the first to sixth bits of said 8-bit codes respectively coincide with the first to sixth bits and the seventh to twelfth bits of said binary code data, the seventh bit of said 8-bit codes always has binary "1", and the eighth bit of said 8-bit codes is assigned to a parity check bit.

9. A magnetic recording layer as recited in claim 1, wherein said field further comprises data of a predetermined bits which is recorded immediately after said identification code and represents contents relating to those information items which are excluded from the information items are indicated by said identification code, and are necessarily recorded on said track.

10. A magnetic recording layer as recited in claim 1, wherein information items recordable in said data block are classified into several groups, and information contents of one field relate to those information items which belong to one of said item groups, and wherein there are several types field start codes corresponding to said item groups, and one type of said field start codes is selectively recorded in the beginning of each field to identify the item group of the information contents in that field.

11. A magnetic recording layer as recited in claim 10, wherein there are several item tables, each storing information items of one of said item groups in a predetermined arrangement along with the necessary bit number for representing the content of each information item, and wherein the number of bits of said binary code data coincides with a maximum number of information items included in one item group, and respective bit positions of said binary code data are correlated to said information items with reference to one of said several item tables which corresponds to the item group identified by said one type field start code.

12. A magnetic recording layer as recited in claim 1, wherein when said identification code is constituted of a number $\underline{n}$ of bytes (n=1, 2, ... ), each byte of said identification code is operated as a binary number, and if [ID-n] represents the numeric value of the binary number of the n-th byte of said identification code, and [N] represents a binary number of said binary code, the relation therebetween is given as follows:

$$[N] = \sum_{i=1}^{n} ([IDi] - \alpha i) \times \beta^{n-i}$$

wherein $\alpha i$, $\beta < n^b$, b=bit number of one byte.

13. A magnetic recording layer as recited in claim 12, wherein when $\alpha i = 16$, $\beta = 100$ and n=2, and $[N]_{DEC}$ represents a numeric value of said binary code data in decimal notation, $[ID-1]_{DEC}$ and $[ID-2]_{DEC}$ represent the numeric values of first and second bytes of said identification code in decimal notation, the relation between the first and second bytes of said identification code and said binary code data is given as follows:

$[N]_{DEC}=([ID-1]_{DEC}-16)\times100+([ID-2]_{DEC}-16)$ $[ID-1]_{DEC}=([N]_{DEC}/100)+16$ $[ID-2]_{DEC}=([N]_{DEC}\text{MOD }100)+16$ wherein "/" represents division with round-off of the decimals, "MOD" means an operation to calculate a remainder.

14. The magnetic recording layer according to claim 1, wherein each position of said bits of said binary code data is assigned to one of said plurality of information items in one-to-one correspondence.

15. A method for recording information on a magnetic recording layer of a photographic filmstrip, comprising the steps of:

recording a series of information segments for a plurality of information items, and an identification code representing binary code data having a predetermined plural number of bits; and assigning each position of said bits of said binary code data to a corresponding one of said plurality of information items, a first value of each of said bits indicating that the content of said corresponding one of said information items is recorded as one of said information segments and a second value of each of said bits indicating that the content of said corresponding one of said information items is not recorded as one of said information segments.

16. The method of claim 15, wherein said assigning step comprises decoding said binary code data with reference to an item table, said item table storing said predetermined information items in an arrangement corresponding to said bit positions of said binary code data, along with a necessary bit length needed for representing the content of each said information item to be recorded as one of said information segments.

17. The method of claim 16, wherein said formatting step comprises recording said information segments in a sequence according to the order of arrangement of said recordable information items in said item table.

18. The method of claim 15, further comprising the step of coinciding a bit pattern of said identification code with a bit pattern of said binary code data.

19. The method of claim 18, further comprising the step of recording a block which comprises a block start code at a leading end thereof, a block end code at a trailing end thereof, and at least one field between said block start code and said block end code, on a longitudinal track while advancing said photographic filmstrip, said field comprising a field start code at a leading end thereof, said information segments, and said identification code disposed between said field start code and said information segments.

20. The method of claim 19, wherein said coinciding step comprises transferring a part of said binary code data to a part of said identification code having a pair of 8-bit codes, and converting a further part of said binary code data to a further part of said identification code, such that said identification code is prohibited from having a same bit pattern as that exhibited by said block start code, said block end code or said field start code.

21. The method of claim 20, wherein said transferring and converting steps include coinciding the first to fifth bits of said 8-bit codes, with first to fifth bits and sixth to tenth bits of said binary code data, assigning an eighth bit of said 8-bit codes to a parity check bit, and determining the sixth and seventh bits of said 8-bit codes based on the three most significant bits of said binary code data.

22. The method of claim 19, wherein said coinciding step comprises transferring at least a part of said binary code data to a part of said identification code, and converting a remaining part of said identification code to a parity check bit and at least one bit which has a constant binary numeral independently of said binary code data.

23. The method of claim 22, wherein said transferring and converting steps include coinciding the first to sixth bits of said 8-bit codes with the first to sixth bits and the seventh to twelfth bits of said binary code data, assigning an eighth bit of said 8-bit codes to a parity check bit, and always supplying a binary "1" to the seventh bit of said 8-bit codes.

24. The method of claim 19, further comprising the step of recording data of predetermined bit length immediately after said identification code to represent contents relating to those said information items which are excluded from said information items that are indicated by said identification code, and are necessarily recorded on said track.

25. The method of claim 19, wherein said formatting step comprises classifying said information items recordable in said data block into several item groups, relating information segments of one field to those said information items which belong to one of said item groups, corresponding several types field start codes to said item groups, and selectively recording said field start codes in the beginning of each field to identify the item group of the information segments in that field.

26. The method of claim 25, wherein said formatting step comprises storing said information items of one of said item groups in a predetermined arrangement along with the necessary bit number for representing the content of each said information item into a plurality of item tables, coinciding the number of bits of said binary code data with a maximum number of said information items included in one item group, and correlating respective bit positions of said binary code data to said information items with reference to one of said several item tables which corresponds to the item group identified by said field start code.

27. The method of claim 15, further comprising the step of setting each byte of said identification code having a number $\underline{n}$ of bytes (n=1, 2, ... ) as a binary number, whereby if [ID-n] represents the numeric value of the binary number of the n-th byte of said identification code, and |N| represents a binary number of said binary code data, the relation therebetween is given as follows:

$$[N] = \sum_{i=1}^{n} ([IDi] - \alpha i) \times \beta^{n-i}$$

wherein $\alpha i$, $\beta < n^b$, b=bit number of one byte.

28. The method of claim 27, wherein when $\alpha i=16$, $\beta=100$ and n=2, and $[N]_{DEC}$ represents a numeric value of said binary code data in decimal notation, and $[ID-1]_{DEC}$ and $[ID-2]_{DEC}$ represent the numeric values of first and second bytes of said identification code in decimal notation, the relation between the first and second bytes of said identification code and said binary code data is given as follows:

$$[N]_{DEC}=([ID-1]_{DEC}-16)\times100+([ID-2]_{DEC}-16)$$

$$[ID-1]_{DEC}=[N]_{DEC}/100)+16$$

$$[ID-2]_{DEC}=[N]_{DEC} \text{ MOD } 100)+16$$

wherein "/" represents division with round-off of the decimals, and "MOD" is an operation to calculate a remainder.

29. The method according to claim 15, wherein the assigning step includes assigning each position of said bits of said binary code data to one of said plurality of information items in one-to-one correspondence.

* * * * *